Patented June 10, 1952

2,599,581

UNITED STATES PATENT OFFICE 2,599,581

CEMENTS FOR ATTACHING SHOE SOLES

John L. Perkins, Arlington, and Edwin E. Sylvester, Brookline, Mass., assignors to B. B. Chemical Co., Boston, Mass., a corporation of Massachusetts No Drawing. Application April 2, 1948, Serial No. 18,706

3 Claims. (Cl. 260—28.5)

This invention relates to adhesive compositions adapted to be activated by heat for securing together leather and shoe parts.

Cements comprising a butadiene-acrylonitrile copolymer and a toughening material are known and have gone into extensive use for securing together leather and shoe parts. A cement of this type, disclosed in the patent to Teppema et al. 2,367,629 of January 16, 1945, comprises a solution of a butadiene-acrylonitrile copolymer and a copolymer of vinyl chloride and vinyl acetate. A coating of the cement is applied as a solution to the sole and upper; and the coating is dried until tack free. The cement is then activated by treatment with a solvent; and the sole and upper are pressed together for a sufficient dwell, e. g., 60 seconds, to form a firm bond between the sole and upper.

It is a feature of the present invention to avoid the expense and inconveniences of solvent activation by providing a new butadiene-acrylonitrile copolymer base cement which may be activated by heat. Soles are bonded to shoe uppers by coating surfaces with the new cement, heating the coated surfaces and pressing them together while the cement is at an elevated temperature.

The new cement comprises a butadiene-acrylonitrile copolymer rubber and a vinyl chloride-vinyl acetate copolymer in which the vinyl chloride constituent predominates, together with basic zinc carbonate $ZnCO_3 \cdot 2Zn(OH)_2 \cdot H_2O$ and a resinous chlorinated paraffin hydrocarbon.

It has been found that the basic zinc carbonate and the chlorinated hydrocarbon coact with the butadiene-acrylonitrile copolymer and vinyl chloride-vinyl acetate copolymer to give a composition which when heated develops the ability to cohere to a similar film. Notwithstanding their action in giving the ability to cohere to heated cement films, it is the peculiar action of the zinc carbonate and chlorinated hydrocarbon to improve, rather than to harm, the cold flow characteristics of the resulting bond. The extraordinary nature of this action is evident from the fact that while the bond may be formed when cement surfaces are heated to a temperature which may be as low as 140° F. and pressed together, the bond gives a remarkably low cold flow value under the usual cold flow test at 120° F.

To obtain this remarkable action, the zinc carbonate is preferably employed in the proportion of about 10 parts to about 30 parts by weight, preferably 25 parts by weight, with 100 parts by weight of the butadiene-acrylonitrile copolymer. The chlorinated hydrocarbon may be used in the proportion of from about 10 parts to about 50 parts by weight, preferably from 30 parts to 40 parts by weight, with 100 parts by weight of the butadiene-acrylonitrile copolymer. Suitable chlorinated paraffins are the material known as Clorafin 70 (obtained from the Hercules Powder Company 908 Market Street, Wilmington 99, Delaware) which has a chlorine content of 69% to 72%, an approximate molecular weight of 1000, and is a light yellow solid with a softening point of 90° to 100° C. and a specific gravity of 1.60 to 1.65; Clorafin 42 (also obtained from the Hercules Powder Company) which has a chlorine content of 42% to 43%, an approximate molecular weight of 500, and is a nonflammable light-colored liquid with a viscosity of 22.5 to 31.5 poises at room temperature and a specific gravity of 1.162 to 1.175; and the material known as Chlorowax (obtained from the Diamond Alkali Company, Oliver Building, Pittsburgh 22, Pennsylvania) a chlorinated paraffin which is believed to have a chlorine content similar to that of Clorafin 70 and which has a specific gravity of 1.64, a molecular weight of approximately 1060, and a melting point of 90° C.

The vinyl chloride-vinyl acetate copolymer is employed in the proportion of approximately 100 parts by weight to 100 parts by weight of the butadiene-acrylonitrile copolymer. However, as little as 75 parts and as much as 125 parts by weight may be employed in combination with 100 parts by weight of the butadiene-acrylonitrile copolymer. Suitable vinyl chloride-vinyl acetate copolymer resins may contain from 9½% to 15% of vinyl acetate and from 85% to 90.5% of vinyl chloride. For best results, it has been found desirable to employ a mixture of these vinyl copolymer resins. A preferred mixture includes one part of a vinyl chloride-vinyl acetate copolymer resin known as "Vinylite VYNS," made by the Carbide and Carbon Chemical Corp., 30 E. 42nd Street, New York 17, New York, which is understood to have a vinyl chloride content of 88.5% to 90.5%, an intrinsic viscosity in cyclohexanone at 20° C. of 0.79, and a specific gravity of 1.36, with from 2 to 4 parts of a vinyl copolymer resin known as "Vinylite VYHH," also manufactured by the Carbide and Carbon Chemical Corp., which is understood to have a vinyl chloride content of 85% to 88%, an intrinsic viscosity of 0.53 and a specific gravity of 1.36. With this mixture of copolymer resins, there may also be included up to 1 part of a copolymer resin known as "Vinylite VYCC," also obtained from the Carbide and Carbon Chemical Corp., which is understood to have a vinyl chloride content of about 62% and vinyl acetate content of about 38%, an intrinsic viscosity of 0.28 and a specific gravity of 1.30.

Suitable butadiene-acrylonitrile copolymer rubbers may contain from about 25% to about 45% of acrylonitrile. Copolymer rubbers which have been found particularly satisfactory are "Hycar OR-15" and "Hycar OR-25," which are obtained from the B. F. Goodrich Company of Akron, Ohio, and which are understood to have acrylonitrile contents of about 45% and about 33% respectively.

It has been found desirable to incorporate a plasticizer such as dioctyl phthalate in the composition for its usual purposes.

Any suitable solvent or solvent mixture capable of dissolving the composition may be employed. It has been found desirable, however, to employ methyl ethyl ketone since it is sufficiently volatile for rapid drying of the cement and forms solutions which are stable over extended periods of time. Sufficient solvent is employed to give an adhesive having a solids content of from 20% to 40% and preferably in the range of from 28 to 32%.

In the bonding of leather or shoe parts by the cement of this invention, the shoe parts, for example, an outsole and shoe upper, are mechanically prepared for sole attaching, preferably by roughing the surface to be attached, for example, by an emery wheel or a wire brush, in order to provide the most satisfactory surfaces for cementing. The cement comprising a solution of the butadiene-acrylonitrile copolymer, the vinyl resins, and the chlorinated paraffin hydrocarbon containing the zinc carbonate in dispersion is then applied preferably to both surfaces to be united. The application of the cement may be by brush, by extrusion or in any other suitable manner. The cement is permitted to dry to form films on the respective attaching surfaces which are anchored securely to the outsole and upper respectively. At any time thereafter, preferably up to about three days after the upper has been coated with adhesive and up to about seven days after the sole has been coated with cement, the outsole and shoe upper may be subjected to heat and pressed together with the attaching surfaces in juxtaposition.

According to a preferred procedure, the coating on the upper may be activated by treatment with an infrared lamp or other heating device; and the coated sole may be heated in a moist heat apparatus. The moist heat apparatus involves a chamber provided with a heater, and a device for bubbling air through a body of water maintained at from 85° to 95° C. The air may be superheated in the chamber to a temperature of from 120° to 180° C. and is circulated around an adhesive coated sole disposed in the chamber. With such treatment it is found that the cement on the leather sole is raised to a temperature suitable for attaching to the upper, e. g., a temperature of from 140° to 150° F., in from 48 seconds to one minute. The outsole and shoe upper on which the cement films are heat activated are then pressed together under a sole attaching pressure, suitably about 80 pounds per square inch, for from 15 to 60 seconds.

It has also been found that it may be unnecessary to activate the cement on the shoe upper, where the cement on the outsole is at a temperature such that it will activate and bond with the unheated adhesive on the upper.

Exceptionally strong bonds have been obtained by the use of the cement and sole adhering method herein disclosed. Bonds are usually obtained giving a peel-pull test of 45 pounds to 50 pounds per square inch, and frequently bonds sufficiently strong to cause failure of the leather are obtained.

The following example of a heat activatable cement is given to aid in understanding the invention and is not to be taken as limiting the invention to the specific ingredients and proportions set forth in the example.

*Example I*

| | Parts by weight |
|---|---|
| Butadiene-acrylonitrile copolymer (Hycar type OR-15) | 100 |
| Zinc carbonate | 25 |
| Chlorinated paraffin hydrocarbon (Clorafin 70) | 40 |
| VYHH resin (copolymer of vinyl chloride-vinyl acetate) | 75 |
| VYNS resin (copolymer of vinyl chloride-vinyl acetate) | 25 |
| Dioctyl phthalate | 20 |
| Methyl ethyl ketone | 700 |

The above composition was prepared by milling together the butadiene-acrylonitrile copolymer with the zinc carbonate and about one-quarter of the chlorinated paraffin to form a uniform mixture. The milled mixture was sheeted out, cut up and dissolved in the solvent in a churn along with the remainder of the chlorinated paraffin, the vinyl resins, and the dioctyl phthalate.

An outsole and a shoe upper were mechanically prepared for sole attaching by roughing, with a wire brush, the surfaces to be attached. A coating of the cement was then applied to the surfaces to be united of both the outsole and the upper, and was permitted to dry. After two days, the coating on the upper was activated by treatment with an infrared lamp to raise its temperature to about 140° F. and the coated sole was placed in a moist heat apparatus maintained at a temperature of about 150° C. through which was circulated air containing moisture which it had picked up in bubbling in a body of water maintained at from 85° to 95° C. After one minute in the chamber, the temperature of the coating had reached approximately 140° F. The outsole and shoe upper on which the coatings had been activated were then pressed together with a pressure of about 80 pounds per square inch for about 60 seconds. A very satisfactory bond between the outsole and the upper was obtained.

Reference is made to our copending application Serial No. 234,453, filed June 29, 1951, which claims related subject-matter.

Having thus described our invention, what we claim as new and desire to secure by Letters Patent of the United States is:

1. A heat activatable cement comprising 100 parts by weight of a butadiene-acrylonitrile copolymer rubber containing from 25% to 45% of acrylonitrile, from 10 to 30 parts by weight of basic zinc carbonate, from 10 to 50 parts by weight of a resinous chlorinated paraffin hydrocarbon having a chlorine content of from 42% to 72% and having a molecular weight between 500 and 1060, and from 70 to 125 parts by weight of a copolymer of vinyl chloride and vinyl acetate containing from 85% to 90.5% of vinyl chloride.

2. A cement adapted to deposit a film activatable by heat and adapted for securing soles to shoe uppers comprising a solution in a volatile organic solvent of 100 parts by weight of a butadiene-acrylonitrile copolymer rubber containing from 25% to 45% of acrylonitrile, from 10 to 30 parts by weight of basic zinc carbonate, from 10 to 50 parts by weight of a chlorinated paraffin hydrocarbon having a chlorine content of from 42% to 72% and having a molecular weight between 500 and 1060, and from 75 to 125 parts of a copolymer of vinyl chloride and vinyl acetate containing from 85% to 90.5% of vinyl chloride.

3. A cement adapted to deposit a film activatable by heat and adapted for securing soles to shoe uppers comprising a solution in a volatile organic solvent of 100 parts by weight of a butadiene-acrylonitrile copolymer rubber containing from 25% to 45% of acrylonitrile, from 10 to 30 parts of basic zinc carbonate, from 10 to 50 parts of a chlorinated paraffin hydrocarbon having a chlorine content of from 42% to 72% and having a molecular weight between 500 and 1060, and from 75 to 125 parts of a mixture of one part of a copolymer of vinyl chloride and vinyl acetate containing from 88.5% to 90.5% of vinyl chloride with from 2 to 4 parts of a copolymer of vinyl chloride and vinyl acetate containing from 85% to 88% of vinyl chloride.

JOHN L. PERKINS.
EDWIN E. SYLVESTER.

REFERENCES CITED

The following references are of record in the file of this patent:

UNITED STATES PATENTS

| Number | Name | Date |
| --- | --- | --- |
| 2,115,214 | Rolle | Apr. 26, 1938 |
| 2,367,629 | Teppema et al. | Jan. 16, 1945 |
| 2,378,715 | Leatherman | June 19, 1945 |
| 2,389,460 | Rinehart | Nov. 20, 1945 |
| 2,395,133 | Mahoney et al. | Feb. 19, 1946 |
| 2,421,408 | Brookman et al. | June 3, 1947 |
| 2,480,298 | Happoldt | Aug. 30, 1949 |

FOREIGN PATENTS

| Number | Country | Date |
| --- | --- | --- |
| 752,736 | France | Sept. 29, 1933 |

OTHER REFERENCES

"The Aroclors," Application Data Bulletin No. P-115, pub. by Monsanto Chemical Co., St. Louis, pp. 3-5.